United States Patent
Khan et al.

(10) Patent No.: US 11,800,596 B2
(45) Date of Patent: Oct. 24, 2023

(54) SYSTEMS AND METHODS FOR TEMPORARY SERVICE PROVISIONING

(71) Applicant: Verizon Patent and Licensing Inc., Basking Ridge, NJ (US)

(72) Inventors: Taussif Khan, Martinsville, NJ (US); Balaji L. Raghavachari, Bridgewater, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 171 days.

(21) Appl. No.: 17/443,395

(22) Filed: Jul. 26, 2021

(65) Prior Publication Data

US 2023/0027672 A1    Jan. 26, 2023

(51) Int. Cl.
*H04W 76/38* (2018.01)
*H04W 8/26* (2009.01)
*H04W 8/24* (2009.01)
*H04W 8/06* (2009.01)

(52) U.S. Cl.
CPC ............. *H04W 76/38* (2018.02); *H04W 8/06* (2013.01); *H04W 8/24* (2013.01); *H04W 8/26* (2013.01)

(58) Field of Classification Search
CPC ......... H04W 76/38; H04W 8/24; H04W 8/06; H04W 8/26; H04W 8/20; H04W 48/04; H04W 12/00
See application file for complete search history.

(56) References Cited

U.S. PATENT DOCUMENTS

| | | | |
|---|---|---|---|
| 9,112,905 B2* | 8/2015 | Mao | H04L 63/162 |
| 2009/0089865 A1* | 4/2009 | Baron | G06F 21/6209 |
| | | | 726/6 |
| 2012/0149334 A1* | 6/2012 | Zhang | H04W 12/068 |
| | | | 455/411 |
| 2014/0099916 A1* | 4/2014 | Mallikarjunan | H04W 8/20 |
| | | | 455/406 |
| 2015/0215844 A1* | 7/2015 | Davis | H04W 8/183 |
| | | | 455/432.1 |
| 2021/0037372 A1* | 2/2021 | Horn | H04W 12/02 |
| 2022/0095111 A1* | 3/2022 | Fu | H04L 63/0853 |

* cited by examiner

*Primary Examiner* — Ricardo H Castaneyra (57) ABSTRACT

In some implementations, a first network device may receive an authorization request associated with a user device connecting to a network associated with first network device. The first network device may redirect the authorization request toward a second network device associated with a second service provider. The first network device may determine, based on a response to the authorization request, that the user device is subscribed to a service provided by the second service provider and that the user device is not authorized to connect to the network. The first network device may provide a temporary service to the user device to enable the user device to connect to the network for a limited period based on the user device being subscribed to the service provided by the second service provider and the user device not being authorized to connect to the network.

20 Claims, 8 Drawing Sheets

SYSTEMS AND METHODS FOR TEMPORARY SERVICE PROVISIONING

BACKGROUND

Fifth Generation/New Radio (5G/NR) provides various enhancements to wireless communications, such as flexible bandwidth allocation, improved spectral efficiency, ultra-reliable low-latency communications (URLLC), beamforming, high-frequency communication (e.g., millimeter wave (mmWave)), and/or the like.

DETAILED DESCRIPTION OF PREFERRED EMBODIMENTS

The following detailed description of example implementations refers to the accompanying drawings. The same reference numbers in different drawings may identify the same or similar elements.

In many instances, a user device is associated with a home network. For example, the user device may be subscribed to the home network and/or be configured to communicate via the home network via a service agreement between a user of the user device and a service provider of the home network. If the user device is not within range of a base station of the home network, but is within range of a visitor network (e.g., a network to which the user device is not registered), the user device may attempt to establish a communication session via the visitor network (which may be referred to herein as "roaming"). In such cases, the visitor network and the home network may communicate to authorize the user device to establish the communication session via the visitor network. For example, the visitor network may request the home network to verify that the user device is subscribed to the home network and/or that the user device is authorized to roam via the visitor network. In such cases, the home network may perform a lookup operation to verify that the user device is authorized to establish a communication session via the visitor network. Based on performing the lookup operation, the home network may verify whether the user device is authorized to communicate via the visitor network according to a subscriber agreement associated with the user device and the home network that authorizes roaming service via the visitor network. The home network may then communicate with the visitor network to indicate whether the user device can establish the communication session via the visitor network.

In some cases, the user device is not authorized to communicate via the visitor network. Because the user device is not authorized to communicate via the visitor network, the visitor network may prevent the user device from establishing a communication session via the visitor network. However, because the user device cannot establish a communication via the visitor network, a user associated with the user device is unable to use the user device to establish service with the visitor network and/or make changes to the subscriber agreement to authorize usage of the visitor network.

In some cases, the user device may include an embedded universal integrated circuit card (eUICC). The eUICC may be embedded in the user device and may store one or more subscriber identity module (SIM) profiles that permit the user device to access one or more networks (e.g., the home network of the user device) at different times (e.g., where only one SIM profile can be enabled at a time). The SIM profiles may be remotely managed using remote SIM provisioning to install, enable, disable, and/or delete SIM profiles from the eUICC. For example, remote SIM provisioning may be used when a subscription associated with the user device changes (e.g., to authorize the user device to communicate via the visitor network) and/or when the user device changes ownership, among other examples. In these cases, because the SIM profile is stored on the eUICC, which is embedded in the user device (rather than stored on a removable SIM card), the user may be unable to install a new SIM profile by simply removing a SIM card storing the current SIM profile and installing a new SIM card storing a new SIM profile. Instead, a new SIM profile may need to be downloaded, installed, and enabled on the eUICC, which may be time consuming.

In such cases, the user may need to wait several minutes after changing the user's subscription for a new SIM profile to be downloaded from a remote SIM provisioning system, installed on the eUICC, and enabled to permit the user to establish a communication session with the visitor network. Further, in locations with poor wireless network service, downloading the SIM profile may increase the amount of time required to download the new SIM profile, may cause errors to be encountered when downloading and/or installing the new SIM profile, or may prevent the new SIM profile from being downloaded to the user device.

Some implementations described herein enable a visitor network device included in a visitor network to provide a temporary service to a user device that is not authorized to establish a communication session with the visitor network (e.g., based on a subscriber agreement associated with the user device and a home network not authorizing a roaming service). For example, a visitor network device included in a visitor network may receive a request to establish a communication session from a user device. The visitor network device may forward the request to a home network device included in a home network of the user device and may receive a response indicating that a roaming service is not authorized for the user device. The visitor network device may determine that, because the response indicated that the roaming service is not authorized for the user device, that the user device is associated with a subscriber agreement for service with the home network and/or that a subscriber identity module (SIM) associated with the user device is a valid SIM. The visitor network device may provide the user device with a temporary service to enable the user device to establish a communication session with the visitor network. The temporary service may be limited based on period of time and/or an amount of data transmitted via the communication session. In some implementations, the visitor network device may provide the user device with information enabling the user device to establish service with the visitor network via the communication session. At the end of the period of time and/or after a limited amount of data has been transmitted, if the user device (e.g., a user of the user device) fails to establish service with the visitor network and/or fails to modify the subscriber agreement with the home network to authorize the roaming service, the visitor network device may disconnect the user device from the visitor network. In this way, a user is provided a temporary service to enable the user device to establish a communication session with a visitor network. The temporary service may enable the user device (e.g., a user of the user device) to establish service with the visitor network thereby preventing the user device from being unable to take any actions to permit a communication session to be established with the visitor network.

Figure 1A:
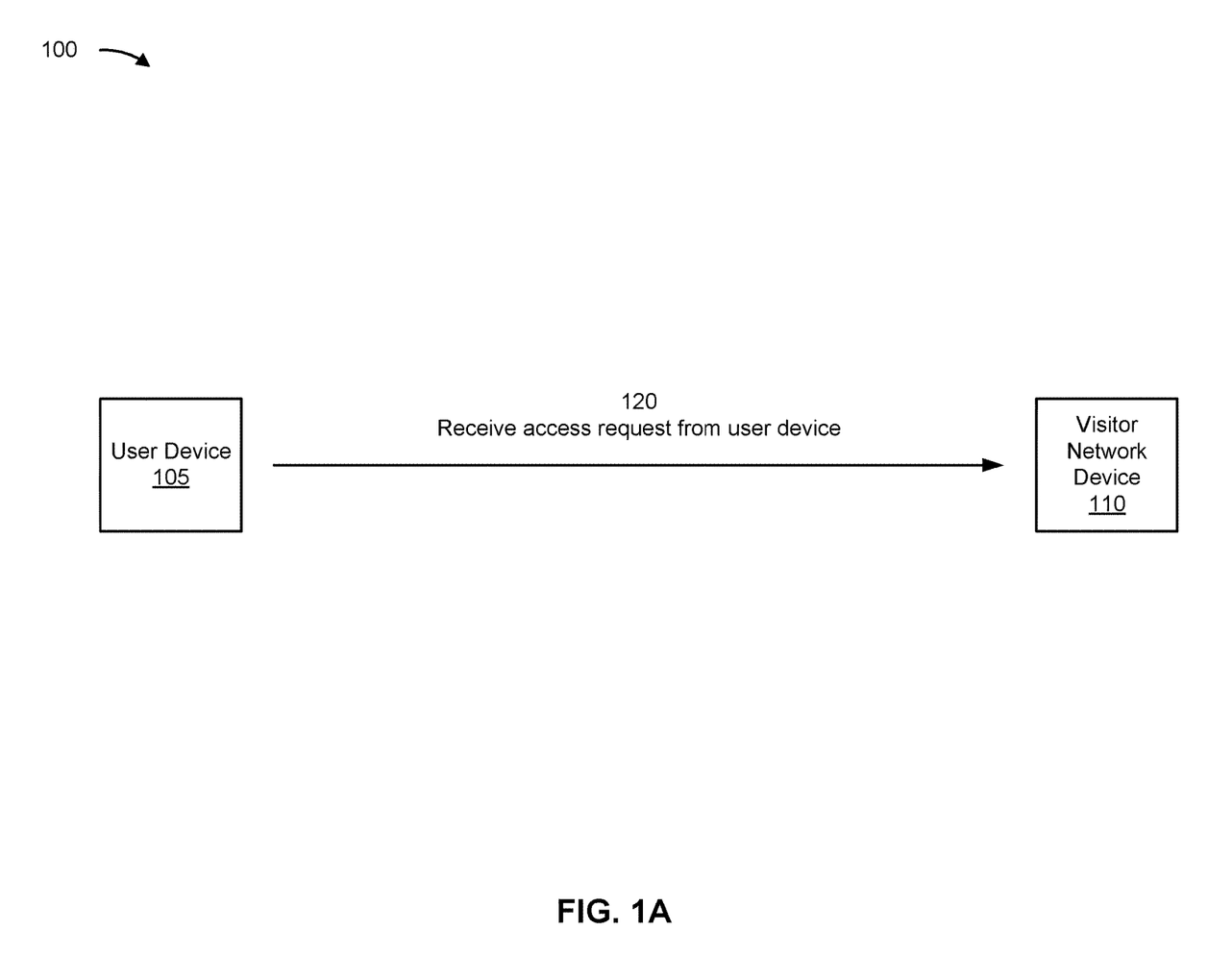
FIGS. 1A-1C, are diagrams of an example associated with temporary service provisioning.
Figure 1B:
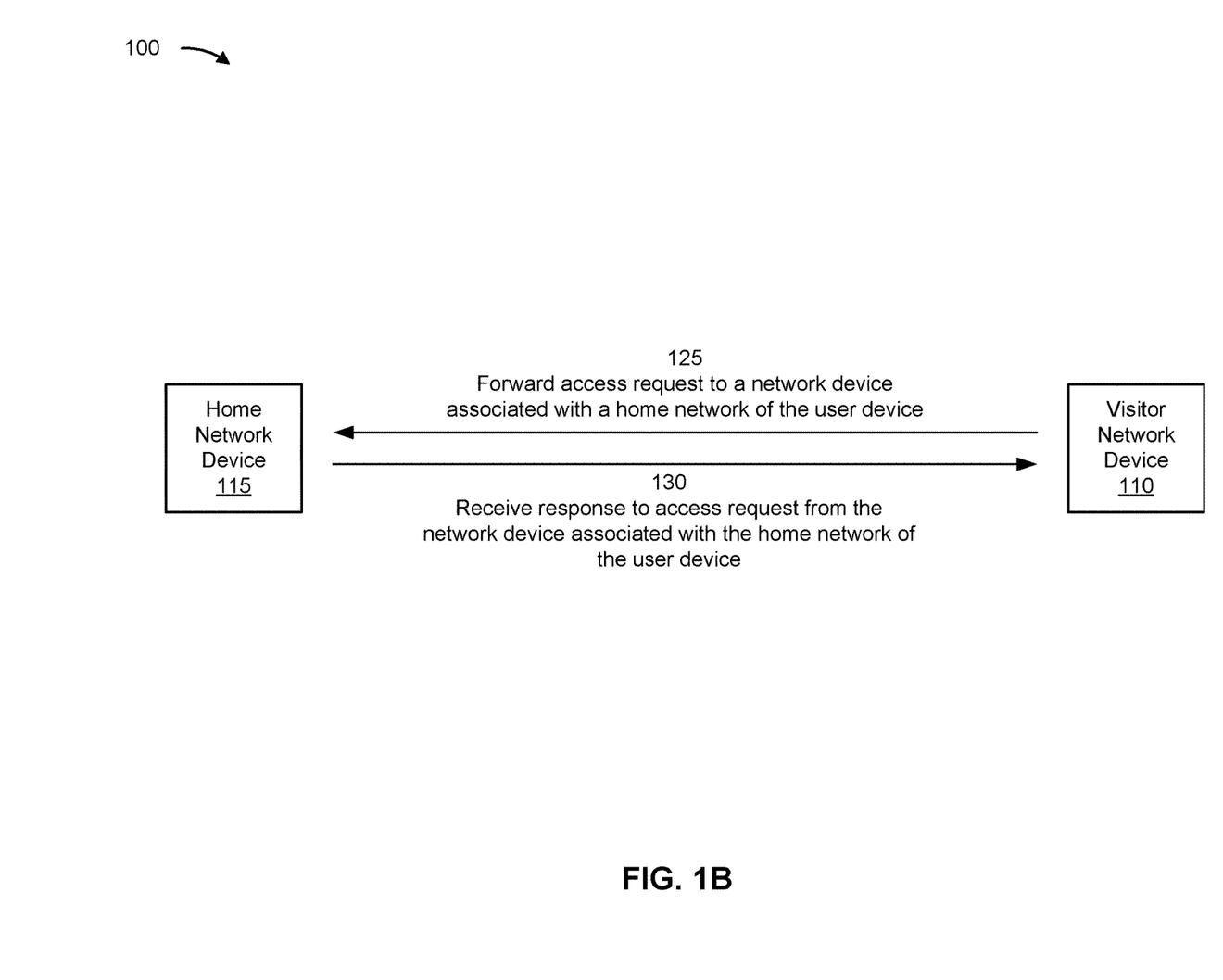
Figure 1C:
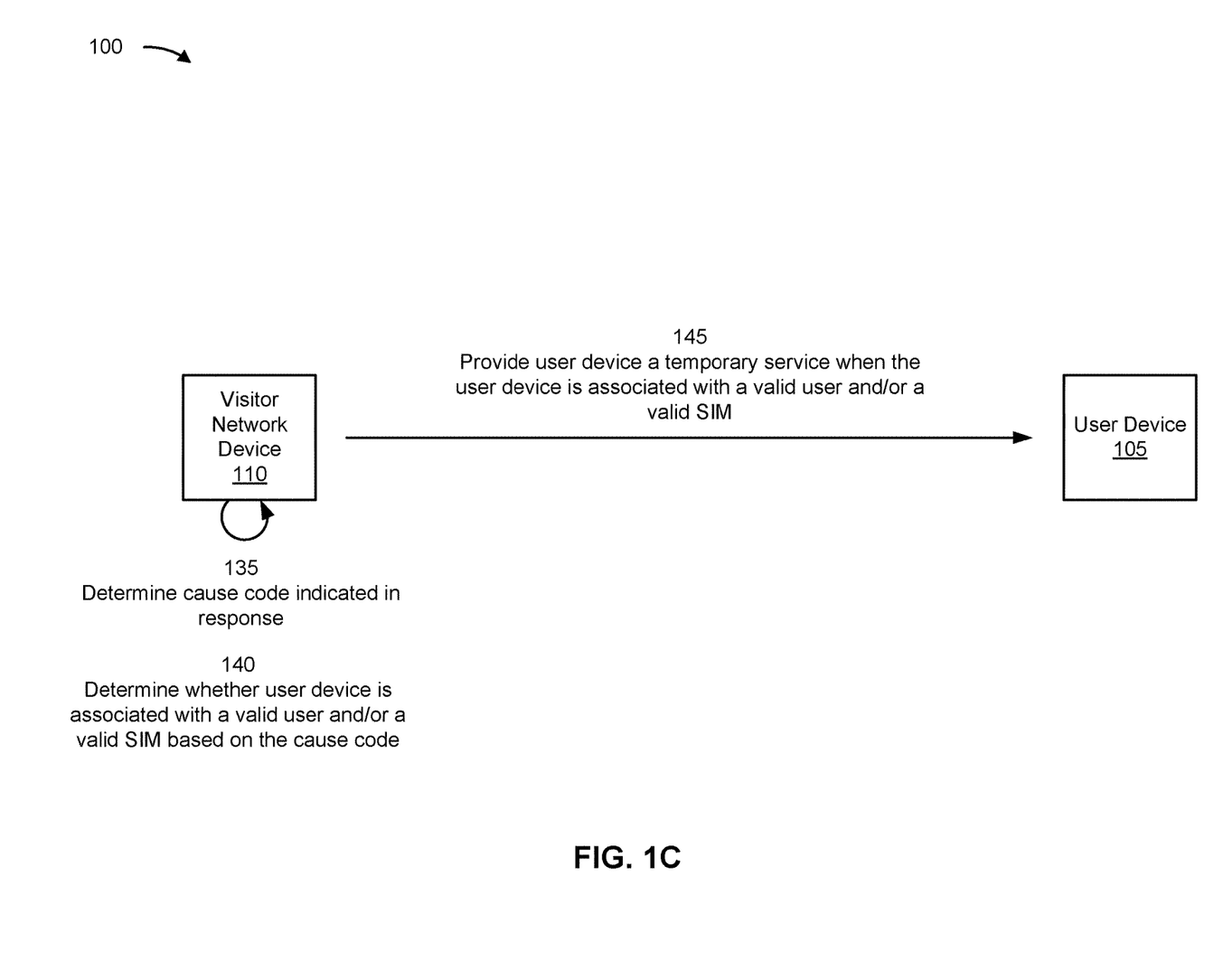

FIGS. 1A-1C are diagrams of an example 100 associated with temporary service provisioning. As shown in FIGS. 1A-1C, example 100 includes a user device 105, a visitor network device 110, and a home network device 115. The user device 105, the visitor network device 110, and the home network device 115 are described in greater detail below.

In some implementations, the user device 105 may be associated with a home network. For example, the user device 105 may be subscribed to the home network and/or be configured to communicate via the home network via a service agreement between a user of the user device 105 and a service provider of the home network.

In some implementations, the user device 105 may not be within range of the home network, but the user device 105 may be within range of a visitor network (e.g., a network to which the user device 105 is not registered). The user device 105 may attempt to establish a communication session via the visitor network based on being within the range of the visitor network. For example, the user device 105 may transmit an access request to the visitor network device 110 to enable the user device 105 to establish a communication session with the visitor network. As shown in FIG. 1A, and by reference number 120, the visitor network device 110 may receive the access request from the user device 105.

In some implementations, the visitor network device 110 is included in a radio access network (RAN). The visitor network device 110 may include one or more devices capable of receiving, processing, storing, routing, and/or providing traffic (e.g., a packet and/or other information or metadata) in a manner described herein. For example, the visitor network device 110 may include a router, such as a label switching router (LSR), a label edge router (LER), an ingress router, an egress router, a provider router (e.g., a provider edge router or a provider core router), a virtual router, or another type of router. Additionally, or alternatively, the visitor network device 110 may include a gateway, a switch, a firewall, a hub, a bridge, a reverse proxy, a server (e.g., a proxy server, a cloud server, or a data center server), a load balancer, and/or a similar device. Alternatively, and/or additionally, the visitor network device 110 may include a device included in a core network of the visitor network, described in greater detail below with respect to FIG. 4.

The visitor network device 110 may receive the access request (e.g., from the user device 105 when the visitor network device 110 is included in the RAN and/or from the RAN when the visitor network device 110 is included in the core network of the visitor network). The access request may include information identifying the user device 105 (e.g., a network identifier associated with the user device 105). The visitor network device 110 may determine that the user device 105 is not subscribed to a service associated with the visitor network and/or is associated with the home network of the user device 105 based on the information identifying the user device 105.

In some implementations, the visitor network device 110 may communicate with the home network device 115 included in the home network of the user device 105 to determine if the user device 105 is authorized to establish the communication session via the visitor network. For example, as shown in FIG. 1B, and by reference number 125, the visitor network device 110 may forward the access request toward (e.g., via one or more other network devices included in the visitor network, the home network of the user device 105, and/or another network) the home network device 115. The visitor network device 110 may forward the access request to the home network device 115 to request the home network device 115 to verify that the user device 105 is subscribed to the home network and/or that the user device 105 is authorized to roam via the visitor network.

The home network device 115 may receive the access request and may perform a lookup operation to determine whether the user device 105 is authorized to establish a communication session via the visitor network. Via the lookup operation, the home network device 115 may determine whether the user device 105 is authorized to communicate via the visitor network based on a subscriber agreement associated with the user device 105 and the home network. The home network device 115 may then communicate with the visitor network (e.g., visitor network device 110) to indicate whether the user device 105 is authorized to establish the communication session via the visitor network.

As shown by reference number 130, the visitor network device 110 may receive a response to the access request from the home network device 115. In some implementations, the response may indicate that the user device 105 is authorized to connect to the visitor network. For example, the user device may be associated with a subscriber agreement that provides a roaming service to the user device 105. The visitor network device 110 may enable the user device 105 to establish a communication session with the visitor network based on the response indicating that the user device is authorized to connect to the visitor network.

In some implementations, the response may indicate that the user device 105 is not authorized to access the visitor network. For example, the user device 105 may not be associated with a subscriber agreement that provides a roaming service to the user device 105, and the response may include information indicating that the user device 105 is not authorized to establish a communication session with the visitor network.

In some implementations, the information indicating that the user device 105 is not authorized to establish a communication session with the visitor network may include a cause code. The cause code may comprise data (e.g., a string of one or more numbers and/or letters) associated with a reason for the home network device 115 determining that the user device 105 is not authorized to establish a communication session associated with the visitor network. For example, the response may include a first cause code indicating that an international mobile subscriber identity (IMSI) associated with the user device 105 is unknown to the home network device 115 (e.g., the user device 105 is not registered with the network associated with the home network device 115), a second cause code indicating that the user device 105 is an illegal user device (e.g., an identity of the user device 105 is not acceptable to the home network device 115), a third cause code indicating that an identity of the user device 105 cannot be derived by the home network device 115, a fourth cause code indicating that the international mobile equipment identity (IMEI) associated with the user device 105 is not accepted by the home network device 115, a fifth cause code indicating that the user device 105 is not authorized to operate enhanced packet services (EPS) services and/or non-EPS services, a sixth cause code indicating that the subscriber agreement associated with the user device 105 does not authorize the user device 105 to operate in an area in which the visitor network device 110 is located, and/or a seventh cause code indicating that the subscriber agreement associated with the user device 105 does not authorize a roaming service, among other examples.

As shown in FIG. 1C, and by reference number 135, the visitor network device 110 may determine a cause code indicated in the response. As shown by reference number 140, the visitor network device 110 may determine whether the user device 105 is associated with a valid user and/or a valid SIM (e.g., eUICC, eSIM, etc) based on the cause code. The visitor network device 110 may determine whether the user device 105 is associated with a valid user and/or a valid SIM based on accessing a data structure (e.g., a database, a table, and/or a list, among other examples) storing information associating cause codes with information indicating whether the cause code indicates that a user device is associated with a valid user and/or a valid SIM.

For example, the visitor network device 110 may determine that the user device 105 is associated with a valid user and/or a valid SIM when the cause code is the fifth cause code, the sixth cause code, and/or the seventh cause code. The visitor network device 110 may determine that the user device 105 is associated with a valid subscriber agreement associated with the network associated with the home network device 115 and that the subscriber agreement does not include a service that enables the user device 105 establishing a communication session with the visitor network based on the cause code being the fifth, sixth, and/or seventh cause code (e.g., rather than the cause code being a cause code that indicates that the user device 105 is not associated with a subscriber agreement and/or is an illegal user device, such as the first, second, third, and fourth cause codes). The visitor network device 110 may determine that the user device 105 is associated with a valid user (e.g., a user subscribed to a service) and/or a valid SIM based on the user device 105 being associated with a valid subscriber agreement and/or the subscriber agreement not including a service that enables the user device to establish a communication session with the visitor network.

As shown by reference number 145, the visitor network device 110 may provide the user device 105 with a temporary service when the user device 105 is associated with a valid user and/or a valid SIM. The temporary service may enable the user device 105 to establish a communication session with the visitor network for a limited time period. The limited time period may be defined as an amount of time (e.g., 5 minutes, 10 minutes, and/or 30 minutes, among other examples). Additionally, or alternatively, the temporary service may enable the user device 105 to establish a communication session with the visitor network for a limited quantity of data transmitted via the communication session (e.g., 1 megabyte (MB), 10 MB, 300 MB, among other examples). The visitor network device 110 may provide the user device 105 with the temporary service as described in greater detail below with respect to FIG. 2.

In this way, the user device 105 is provided a temporary service to enable the user device 105 to establish a communication session (e.g., a non-time-limited and/or data limited communication session) with the visitor network. The temporary service may enable the user device 105 (e.g., a user of the user device) to establish service with the visitor network thereby preventing the user device 105 from being unable to take any actions to permit a communication session to be established via the visitor network.

In some implementations, the visitor network device 110 may provide a service opportunity to the user device 105 to enable the user device 105 to subscribe to a service provided by the service provider associated with the visitor network. For example, the visitor network device 110 may provide a message (e.g., a short message service (SMS) message, an email, a rich communication services (RCS) message, and/or a text message, among other examples) to the user device 105 that includes information indicating a method for subscribing to a service provided by the service provider associated with the visitor network. In some implementations, the message includes a link and/or a uniform resource locator (URL) to a web page that enables the user to subscribe to the service.

As indicated above, FIGS. 1A-1C are provided as an example. Other examples may differ from what is described with regard to FIGS. 1A-1C. The number and arrangement of devices shown in FIGS. 1A-1C are provided as an example. In practice, there may be additional devices, fewer devices, different devices, or differently arranged devices than those shown in FIGS. 1A-1C. Furthermore, two or more devices shown in FIGS. 1A-1C may be implemented within a single device, or a single device shown in FIGS. 1A-1C may be implemented as multiple, distributed devices. Additionally, or alternatively, a set of devices (e.g., one or more devices) shown in FIGS. 1A-1C may perform one or more functions described as being performed by another set of devices shown in FIGS. 1A-1C.

Figure 2:
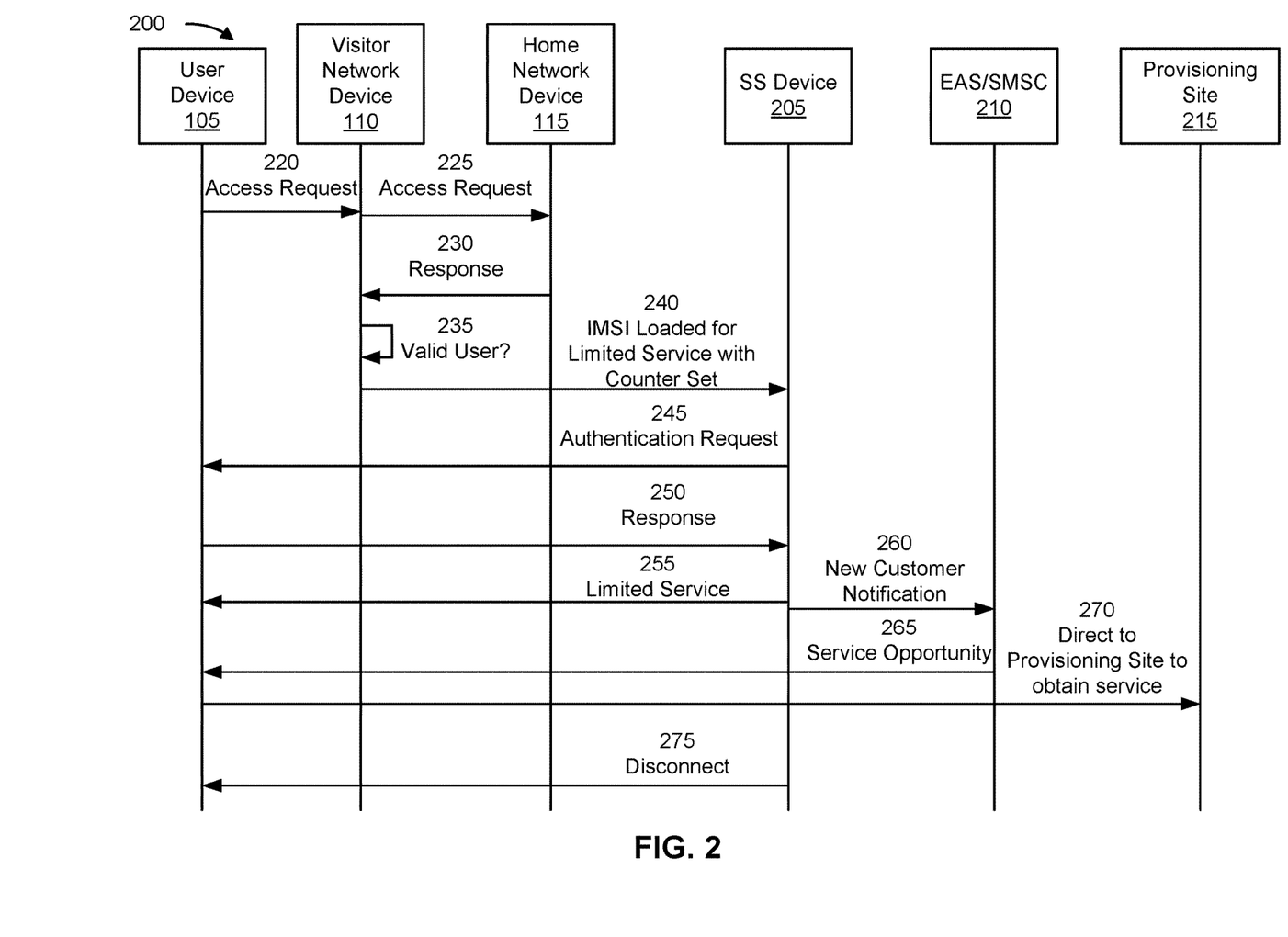
FIGS. 2 and 3 are signal diagrams of an exemplary signal flow associated with an embodiment of temporary service provisioning.

FIG. 2 is a call flow diagram of an example 200 associated with temporary service provisioning. As shown in FIG. 2, example 200 includes communication between a user device 105, a visitor network device 110 associated with a visitor network, a home network device 115 associated with a home network of the user device 105, a subscriber system (SS) device 205 associated with the visitor network, an enhanced messaging service (EMS)/short message service center (SMSC) 210 (e.g., included in a short message service function (SMSF) of a core network), and a provisioning site 215.

As shown by reference number 220, the visitor network device 110 may receive an access request from the user device 105. In some implementations, the visitor network device 110 may receive the access request in a manner similar to that described above. The visitor network device 110 may determine a home network associated with the user device 105 based on information included in the access request (e.g., information identifying the user device 105) and, as shown by reference number 225, the visitor network device 110 may forward the access request towards the home network device 115 associated with the home network of the user device 105.

The home network device 115 may receive the access request and may determine whether the user device 105 is authorized to establish a communication session with the visitor network. In some implementations, the home network device 115 may determine whether the user device 105 is authorized to establish a communication session with the visitor network in a manner similar to that described above.

In some implementations, the home network device 115 may determine that the user device 105 is not authorized to establish a communication session with the visitor network based on a subscriber agreement associated with the user device 105 indicating that the user device 105 is not authorized to operate EPS services and/or non-EPS services. For example, the home network device 115 may generate a response that includes the fifth cause code, described above.

In some implementations, the home network device 115 may determine that the user device 105 is not authorized to establish a communication session with the visitor network based on a subscriber agreement associated with the user device 105 indicating that the user device 105 is not authorized to operate in an area in which the visitor network device 110 is located. For example, the home network device 115 may generate a response that includes the sixth cause code, described above.

In some implementations, the home network device 115 may determine that the user device 105 is not authorized to establish a communication session with the visitor network based on a subscriber agreement associated with the user device 105 not providing a roaming service. The home network device 115 may generate a response indicating that the user device 105 is not authorized to establish a communication session with the visitor network based on a subscriber agreement associated with the user device 105 not providing a roaming service. For example, the home network device 115 may generate a response that includes the seventh cause code, described above.

As shown by reference number 230, the visitor network device 110 may receive the response from the home network device 115. As shown by reference number 235, the visitor network device 110 may determine whether the user device 105 is associated with a valid user and/or a valid SIM based on the response. In some implementations, the response includes the fifth cause code, the sixth cause code, and/or the seventh cause code and the visitor network device 110 may determine that the user device 105 is associated with a valid user and/or a valid SIM based on the response including the seventh cause code, in a manner similar to that described above.

In some implementations, the visitor network device 110 may provide the user device 105 with a temporary service based on the user device 105 being associated with a valid user and/or a valid SIM. In some implementations, the visitor network device 110 may provide the temporary service to the user device 105 based on sending information indicating that the user device 105 is to be provided the temporary service to the SS device 205. As shown by reference number 240, the visitor network device 110 may provide an IMSI associated with the user device 105, information indicating that the user device 105 is to be provided a temporary service (e.g., information indicating a limited time period associated with the temporary service and/or information associated with a limited quantity of transmitted data associated with the temporary service), among other examples.

In some implementations, the SS device 205 may receive the information from the visitor network device 110 and may perform an authentication procedure based on receiving the information. The authentication procedure may be performed to validate a form of a set of authentication credentials (rather than authenticating the user device 105 based on the set of authentication credentials), as described in greater detail below. As shown by reference number 245, the SS device 205 may transmit an authentication request requesting a set of authentication credentials (e.g., a user name, a password, and/or a personal identification number (PIN), among other examples) to the user device 105.

The user device 105 may receive the authentication request and may provide a response to the SS device 205. The response may include a set of authentication credentials associated with the user device 105 and/or a user of the user device 105.

As shown by reference number 250, the SS device 205 may receive the response. In some implementations, the SS device 205 may determine whether the response is a valid response. The SS device 205 may determine whether the response is a valid response based on a format of the authentication credentials included in the response. For example, the SS device 205 may determine whether the response is a valid response based on a quantity of values included in the set of authentication credentials, a format of the set of authentication credentials, and/or a type of character (e.g., letters, numbers, and/or special characters) of which the set of credentials are comprised. In this way, the SS device 205 may prevent providing a temporary service to the user device 105 in certain situations, such as a child playing with a phone of the child's parent and/or the response being machine generated rather than input by a user, among other examples.

In some implementations, the SS device 205 may determine that the response is a valid response. As shown by reference number 255, the SS device 205 may provide the temporary service to the user device 105 based on determining that the response is a valid response. The user device 105 may establish a communication session with the visitor network based on being provided the temporary service.

In some implementations, the SS device 205 causes information for enabling the user device 105 to subscribe to a service provided by a service provider associated with the visitor network based on providing the temporary service to the user device 105. In some implementations, as shown by reference number 260, the SS device 205 may provide a new customer notification to the EAS/SMSC 210 based on providing the temporary service to the user device 105. The new customer notification may include information identifying the user device 105 and/or the communication session established by the user device 105 with the visitor network.

As shown by reference number 265, the EAS/SMSC 210 may provide a service opportunity to the user device 105 based on receiving the new customer notification. The EAS/SMSC 210 may provide the service opportunity via a message (e.g., a short message service message) that can be displayed to a user of the user device 105 via a display of the user device 105. The message may include information indicating that the user's subscriber agreement does not include a roaming service, that a temporary service is being provided to the user by a service provider associated with the visitor network, limitations for which the temporary service is to be provided (e.g., limited time and/or limited data), and/or information enabling the user to subscribe to a service provided by the service provider associated with the visitor network (e.g., a link to a web page and/or other information that enables users to subscribe to a service provided by the service provider).

In some implementations, the user may utilize the information included in the service opportunity to subscribe to a service provided by the service provider associated with the visitor network. For example, the service opportunity may include a link to a provisioning site (e.g., a web page) for subscribing to a service. The user may select the link and, as shown by reference number 270, the user device 105 may be directed to the provisioning site (e.g., a web page) to enable the user to obtain the service from the visitor network.

In some implementations, a limitation of the temporary service may be suspended based on the user selecting the link and/or the user device 105 being directed to the provisioning site. For example, the SS device 205 may utilize a counter to monitor the limited time period and/or the limited data allowance associated with the temporary service. The SS device 205 may pause the counter (e.g., prevent a value of the counter from decreasing) based on the user selecting the link and/or the user device 105 being directed to the provisioning site.

In some implementations, the user may not obtain the service from the visitor network. The SS device 205 may resume monitoring the limited time period and/or the limited data allowance associated with the temporary service based on the user failing to obtain the service from the visitor network. The SS device may terminate the temporary service based on the expiration of the limited time period and/or usage of the limited data allowance, as described in greater detail below.

In some implementations, the user may obtain the service from the visitor network. The SS device 205 may cause the service obtained by the user to be provided to the user device 105 and may terminate the temporary service based on the service obtained by the user being provided to the user device 105.

In some implementations, the user may not select the link and/or access the information to obtain the service provided by the service provider associated with the visitor network and the SS device 205 may provide the temporary service for the limited amount of time and/or a limited amount of data transmitted via the communication session established by the user device 105 with the visitor network. In some implementations, the SS device 205 may determine the expiration of the temporary service (e.g., the limited time period and/or limited data allowance) based on setting a counter. The counter may be set to an initial value and may be incremented based on a passage of an amount of time and/or an amount of data transmitted via a communication established via the temporary service. The SS device 205 may determine an expiration of the temporary service based on the counter being incremented to a value indicated in the information received from the visitor network device 110. As shown by reference number 275, the SS device 205 may cause the user device 105 to be disconnected from the visitor network based on the expiration of the temporary service.

As indicated above, FIG. 2 is provided as an example. Other examples may differ from what is described with regard to FIG. 2. The number and arrangement of devices shown in FIG. 2 are provided as an example. In practice, there may be additional devices, fewer devices, different devices, or differently arranged devices than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) shown in FIG. 2 may perform one or more functions described as being performed by another set of devices shown in FIG. 2.

Figure 3:
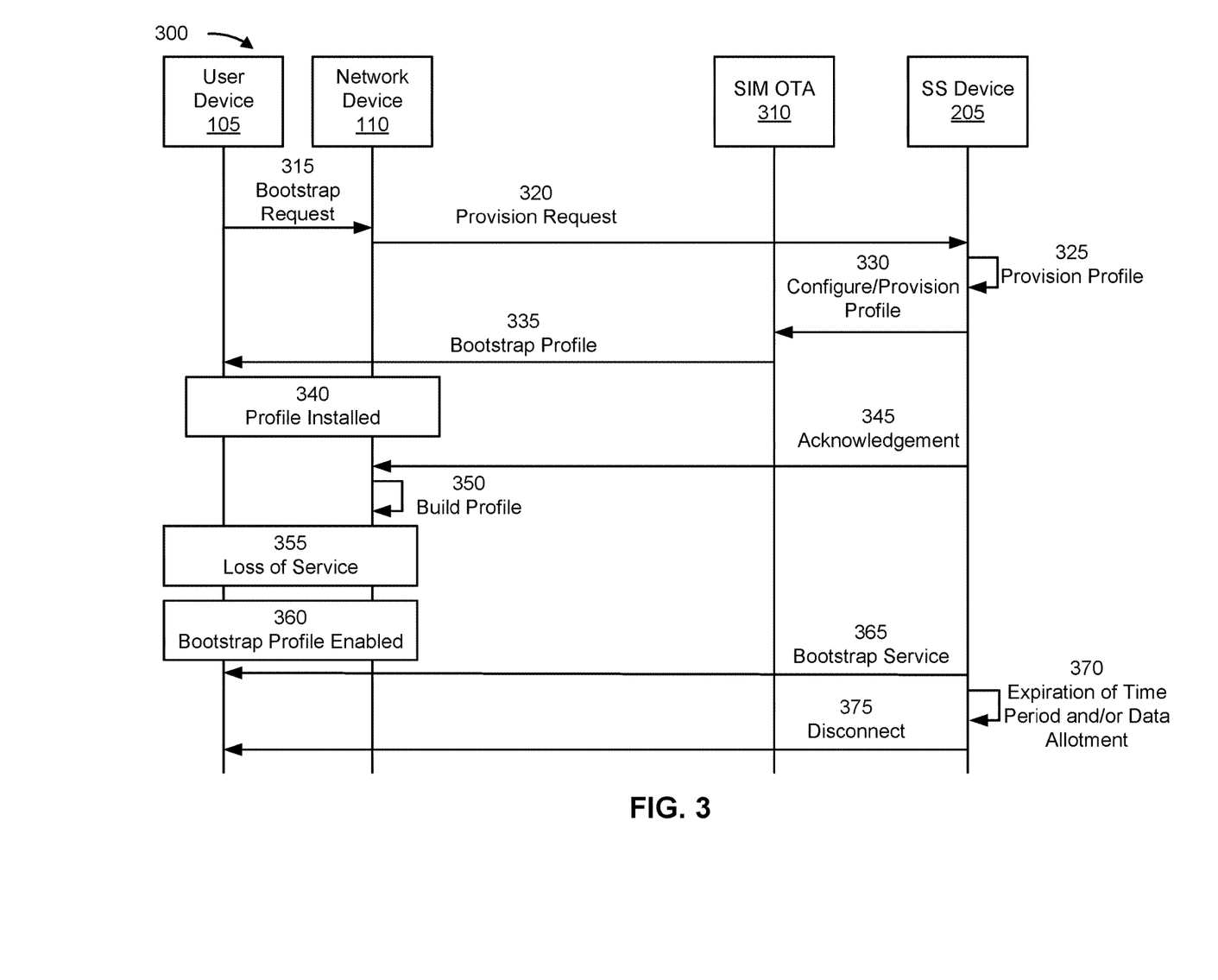

FIG. 3 is a call flow diagram of an example 300 associated with temporary service provisioning. As shown in FIG. 3, example 300 includes communication between a user device 105, a visitor network device 110, a SIM over-the-air (OTA) function 310, and an SS device 205. The communication may be related to providing a bootstrap (e.g., backup) service to the user device 105. The bootstrap service may include a service provided to the user device by a second service provider that provides service to the user device when a service provided by another service provider fails and/or is not available.

As shown by reference number 315, the user device 105 may provide a bootstrap request to the visitor network device 110. The bootstrap request may be a request for a bootstrap service to be provided by a first service provider associated with the visitor network device 110. As an example, a user of the user device 105 may be subscribed to a service provided by a second service provider. The user may have a call scheduled and may subscribe to the bootstrap service to ensure that, if the service provided by the second service provider fails and/or is unavailable, the user can conduct the call via the bootstrap service. In some implementations, the bootstrap request may include information identifying the user and/or the user device 105 and/or may indicate an amount of time the bootstrap service is to be provided (e.g., 10 minutes, 30 minutes, 1 hour, among other examples) and/or a quantity of data that is permitted to be transmitted via the bootstrap service, among other examples.

The visitor network device 110 may receive the bootstrap request and, as shown by reference number 320 may provide a provision request to the SS device 205. The provision request may include information indicating that a bootstrap service is to be provided to the user device 105. Alternatively, and/or additionally, the provision request may include information identifying the user, the user device 105, the amount of time the bootstrap service is to be provided, and/or the quantity of data that is permitted to be transmitted via the bootstrap service, among other examples.

As shown by reference number 325, the SS device 205 may provision a profile associated with the user device 105 based on the provision request. For example, as shown by reference number 330, the SS device 205 may provide a request to the SIM OTA 310 (e.g., a subscription manager-data provisioning (SM-DP) function associated with the SIM OTA 310) to cause the SIM OTA 310 to generate a user device bootstrap profile for the user device 105. The SIM OTA 310 may generate the user device bootstrap profile and, as shown by reference number 335, may provide the user device bootstrap profile to the user device 105. As shown by reference number 340, the user device may install the user device bootstrap profile based on receiving the user device bootstrap profile from the SIM OTA 310.

As shown by reference number 345, the SS device 205 may provide an acknowledge to the visitor network device 110. The visitor network device 110 may receive the acknowledgement and, as shown by reference number 350, may generate a network bootstrap profile associated with the user device 105. The network bootstrap profile may identify the user device 105 and may include information indicating a time period and a data allotment for which the bootstrap service is to be provided.

Subsequently, as shown by reference number 355, the user device 105 may experience a loss of the service provided by the second service provider. For example, the user device 105 may enter an area in which the service provided by the second service provider is unavailable, a network device associated with the second service provider may experience an issue that prevents and/or degrades the service provided by the second service provider to the user device, and/or network congestion may limit the quality of service that the second service provider is able to provide to the user device 105, among other examples.

As shown by reference number 360, the user device 105 may enable the user device bootstrap profile based on the loss of service. In some implementations, the user device 105 may send an access request associated with the bootstrap service and/or other information indicating that the bootstrap service is to be provided to the user device 105 to the visitor network device 110. As shown by reference number 365, the SS device 205 may cause the bootstrap service to be provided to the user device 105 based on the user device bootstrap profile being enabled.

As shown by reference number 370, the SS device 205 may determine that an expiration of a time period and/or a data allotment associated with the bootstrap service. In some implementations, the SS device 205 may determine the expiration of the time period and/or the data allotment based on a counter associated with an amount of time and/or a quantity of data, as described above. As shown by reference number 375, the SS device 205 may cause the user device 105 to be disconnected from the network of the first service provider based on the expiration of the time period.

As indicated above, FIG. 3 is provided as an example. Other examples may differ from what is described with regard to FIG. 3. The number and arrangement of devices shown in FIG. 3 are provided as an example. In practice, there may be additional devices, fewer devices, different devices, or differently arranged devices than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) shown in FIG. 3 may perform one or more functions described as being performed by another set of devices shown in FIG. 3.

Figure 4:
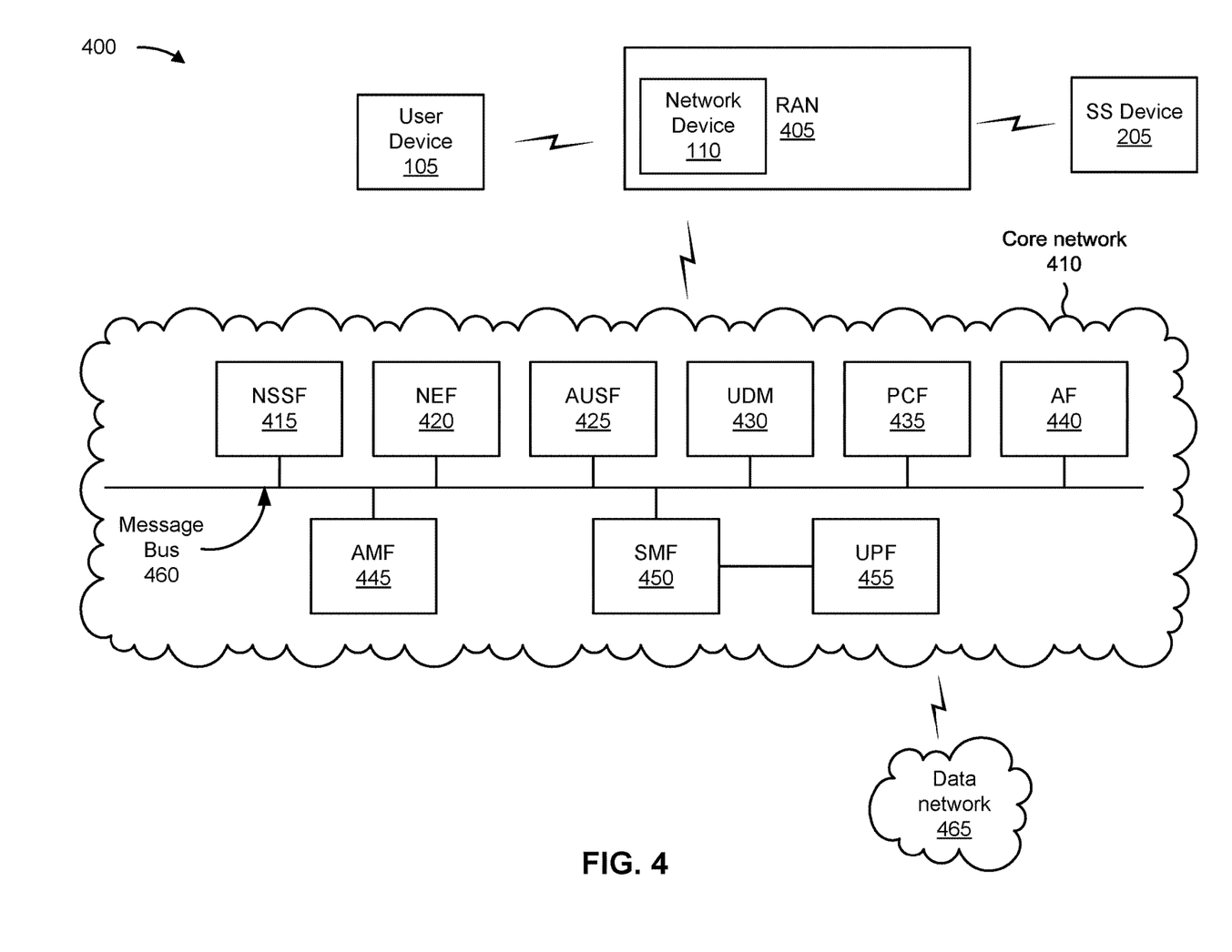
FIG. 4 is a diagram of an example environment in which systems and/or methods described herein may be implemented.

FIG. 4 is a diagram of an example environment 400 in which systems and/or methods described herein may be implemented. As shown in FIG. 4, example environment 400 may include a user device 105, a visitor network device 110, an SS device 205, a radio access network (RAN 405), a core network 410, and a data network 465. Devices and/or networks of example environment 400 may interconnect via wired connections, wireless connections, or a combination of wired and wireless connections.

The user device 105 includes one or more devices capable of receiving, generating, storing, processing, and/or providing information, such as information described herein. For example, the user device 105 can include a mobile phone (e.g., a smart phone or a radiotelephone), a laptop computer, a tablet computer, a desktop computer, a handheld computer, a gaming device, a wearable communication device (e.g., a smart watch or a pair of smart glasses), a mobile hotspot device, a fixed wireless access device, customer premises equipment, an autonomous vehicle, or a similar type of device.

The visitor network device 110 includes one or more devices capable of receiving, processing, storing, routing, and/or providing traffic (e.g., a packet and/or other information or metadata) in a manner described herein. For example, the visitor network device 110 may include a router, such as a label switching router (LSR), a label edge router (LER), an ingress router, an egress router, a provider router (e.g., a provider edge router or a provider core router), a virtual router, or another type of router. Additionally, or alternatively, the visitor network device 110 may include a gateway, a switch, a firewall, a hub, a bridge, a reverse proxy, a server (e.g., a proxy server, a cloud server, or a data center server), a load balancer, and/or a similar device. In some implementations, the visitor network device 110 may be a physical device implemented within a housing, such as a chassis. In some implementations, the visitor network device 110 may be a virtual device implemented by one or more computing devices of a cloud computing environment or a data center. In some implementations, a group of network devices 110 may be a group of data center nodes that are used to route traffic flow through a network. In some implementations, the visitor network device 110 may be included in the RAN 405 (e.g., as shown in FIG. 4). Alternatively, and/or additionally, the visitor network device 110 may be included in the core network 410.

The SS device 205 includes one or more devices, such as one or more server devices, capable of managing (e.g., receiving, generating, storing, processing, providing, and/or the like) information associated with user device 105. For example, the SS device 205 may manage subscription information associated with user device 105, such as information that identifies a subscriber profile of a user associated with user device 105, information that identifies a temporary service provided to the user device 105, information that identifies a bootstrap service associated with the user device 105, information that identifies services and/or applications that are accessible to user device 105, location information associated with user device 105, a network identifier (e.g., a network address) that identifies user device 105, information that identifies a treatment of user device 105 (e.g., quality of service information, a quantity of minutes allowed per time period, a quantity of data consumption allowed per time period, etc.), and/or similar information. The SS device 205 may provide this information to one or more other devices of environment 400 to support the operations performed by those devices, as described herein. In some implementations, the SS device 205 may be included in the core network 410. For example, the SS device 205 may include, or be included in, the network exposure function (NEF) 420, the authentication server function (AUSF) 425, the unified data management (UDM) component 430, and/or the application function (AF) 445, described below.

RAN 405 may support, for example, a cellular radio access technology (RAT). RAN 405 may include one or more base stations (e.g., base transceiver stations, radio base stations, node Bs, eNodeBs (eNBs), gNodeBs (gNBs), base station subsystems, cellular sites, cellular towers, access points, transmit receive points (TRPs), radio access nodes, macrocell base stations, microcell base stations, picocell base stations, femtocell base stations, or similar types of devices) and other network entities that can support wireless communication for user device 105. RAN 405 may transfer traffic between user device 105 (e.g., using a cellular RAT), one or more base stations (e.g., using a wireless interface or a backhaul interface, such as a wired backhaul interface), and/or core network 410. RAN 405 may provide one or more cells that cover geographic areas.

In some implementations, RAN 405 may perform scheduling and/or resource management for user device 105 covered by RAN 405 (e.g., user device 105 covered by a cell provided by RAN 405). In some implementations, RAN 405 may be controlled or coordinated by a network controller, which may perform load balancing, network-level configuration, and/or other operations. The network controller may communicate with RAN 405 via a wireless or wireline backhaul. In some implementations, RAN 405 may include a network controller, a self-organizing network (SON) module or component, or a similar module or component. In other words, RAN 405 may perform network control, scheduling, and/or network management functions (e.g., for uplink, downlink, and/or sidelink communications of user device 105 covered by RAN 405).

In some implementations, core network 410 may include an example functional architecture in which systems and/or methods described herein may be implemented. For example, core network 410 may include an example architecture of a fifth generation (5G) next generation (NG) core network included in a 5G wireless telecommunications system. While the example architecture of core network 410 shown in FIG. 4 may be an example of a service-based architecture, in some implementations, core network 410 may be implemented as a reference-point architecture and/or a 4G core network, among other examples.

As shown in FIG. 4, core network 410 may include a number of functional elements. The functional elements may include, for example, a network slice selection function (NSSF) 415, an NEF 420, an AUSF 425, a UDM component 430, a policy control function (PCF) 435, an AF 440, an access and mobility management function (AMF) 445, a session management function (SMF) 450, and/or a user plane function (UPF) 455 These functional elements may be communicatively connected via a message bus 460. Each of the functional elements shown in FIG. 4 is implemented on one or more devices associated with a wireless telecommunications system. In some implementations, one or more of the functional elements may be implemented on physical devices, such as an access point, a base station, and/or a gateway. In some implementations, one or more of the functional elements may be implemented on a computing device of a cloud computing environment.

NSSF 415 includes one or more devices that select network slice instances for user device 105. By providing network slicing, NSSF 415 allows an operator to deploy multiple substantially independent end-to-end networks potentially with the same infrastructure. In some implementations, each slice may be customized for different services.

NEF 420 includes one or more devices that support exposure of capabilities and/or events in the wireless telecommunications system to help other entities in the wireless telecommunications system discover network services.

AUSF 425 includes one or more devices that act as an authentication server and support the process of authenticating user device 105 in the wireless telecommunications system.

UDM 430 includes one or more devices that store user data and profiles in the wireless telecommunications system. UDM 430 may be used for fixed access and/or mobile access in core network 410.

PCF 435 includes one or more devices that provide a policy framework that incorporates network slicing, roaming, packet processing, and/or mobility management, among other examples.

AF 440 includes one or more devices that support application influence on traffic routing, access to NEF 420, and/or policy control, among other examples.

AMF 445 includes one or more devices that act as a termination point for non-access stratum (NAS) signaling and/or mobility management, among other examples.

SMF 450 includes one or more devices that support the establishment, modification, and release of communication sessions in the wireless telecommunications system. For example, SMF 450 may configure traffic steering policies at UPF 455 and/or may enforce user equipment internet protocol (IP) address allocation and policies, among other examples.

UPF 455 includes one or more devices that serve as an anchor point for intraRAT and/or interRAT mobility. UPF 455 may apply rules to packets, such as rules pertaining to packet routing, traffic reporting, and/or handling user plane QoS, among other examples.

Message bus 460 represents a communication structure for communication among the functional elements. In other words, message bus 460 may permit communication between two or more functional elements.

Data network 465 includes one or more wired and/or wireless data networks. For example, data network 465 may include an IP Multimedia Subsystem (IMS), a public land mobile network (PLMN), a local area network (LAN), a wide area network (WAN), a metropolitan area network (MAN), a private network such as a corporate intranet, an ad hoc network, the Internet, a fiber optic-based network, a cloud computing network, a third party services network, an operator services network, and/or a combination of these or other types of networks.

The number and arrangement of devices and networks shown in FIG. 4 are provided as an example. In practice, there may be additional devices and/or networks, fewer devices and/or networks, different devices and/or networks, or differently arranged devices and/or networks than those shown in FIG. 4. Furthermore, two or more devices shown in FIG. 4 may be implemented within a single device, or a single device shown in FIG. 4 may be implemented as multiple, distributed devices. Additionally, or alternatively, a set of devices (e.g., one or more devices) of example environment 400 may perform one or more functions described as being performed by another set of devices of example environment 400.

Figure 5:
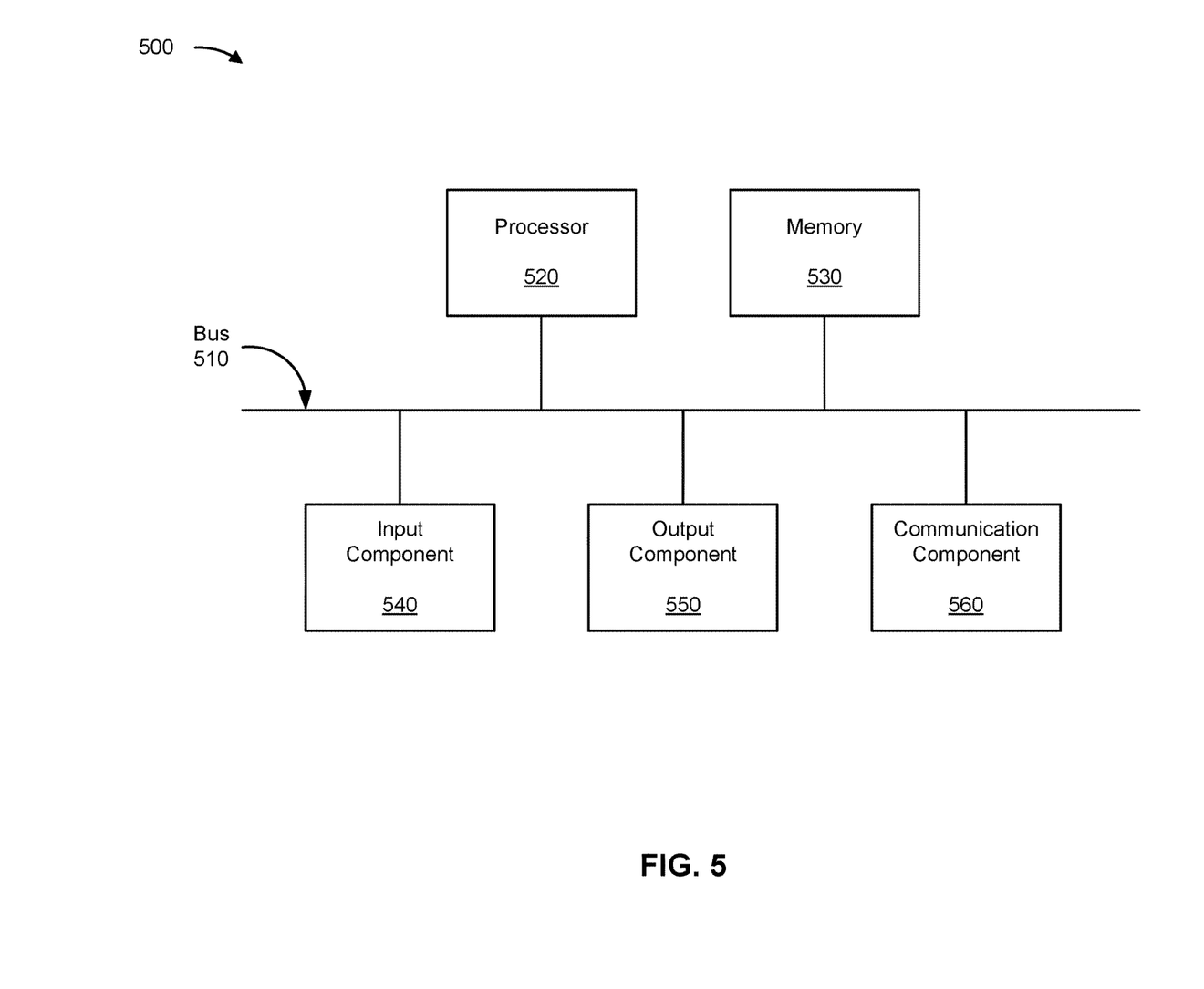
FIG. 5 is a diagram of example components of one or more devices of FIG. 4.

FIG. 5 is a diagram of example components of a device 500, which may correspond to user device 105, visitor network device 110, home network device 115, SS device 205, NSSF 415, NEF 420, AUSF 425, UDM 430, PCF 435, AF 440, AMF 445, SMF 450, and/or UPF 455. In some implementations, user device 105, visitor network device 110, home network device 115, SS device 205, NSSF 415, NEF 420, AUSF 425, UDM 430, PCF 435, AF 440, AMF 445, SMF 450, and/or UPF 455 may include one or more devices 500 and/or one or more components of device 500. As shown in FIG. 5, device 500 may include a bus 510, a processor 520, a memory 530, an input component 540, an output component 550, and a communication component 560.

Bus 510 includes one or more components that enable wired and/or wireless communication among the components of device 500. Bus 510 may couple together two or more components of FIG. 5, such as via operative coupling, communicative coupling, electronic coupling, and/or electric coupling. Processor 520 includes a central processing unit, a graphics processing unit, a microprocessor, a controller, a microcontroller, a digital signal processor, a field-programmable gate array, an application-specific integrated circuit, and/or another type of processing component. Processor 520 is implemented in hardware, firmware, or a combination of hardware and software. In some implementations, processor 520 includes one or more processors capable of being programmed to perform one or more operations or processes described elsewhere herein.

Memory 530 includes volatile and/or nonvolatile memory. For example, memory 530 may include random access memory (RAM), read only memory (ROM), a hard disk drive, and/or another type of memory (e.g., a flash memory, a magnetic memory, and/or an optical memory). Memory 530 may include internal memory (e.g., RAM, ROM, or a hard disk drive) and/or removable memory (e.g., removable via a universal serial bus connection). Memory 530 may be a non-transitory computer-readable medium. Memory 530 stores information, instructions, and/or software (e.g., one or more software applications) related to the operation of device 500. In some implementations, memory 530 includes one or more memories that are coupled to one or more processors (e.g., processor 520), such as via bus 510.

Input component 540 enables device 500 to receive input, such as user input and/or sensed input. For example, input component 540 may include a touch screen, a keyboard, a keypad, a mouse, a button, a microphone, a switch, a sensor, a global positioning system sensor, an accelerometer, a gyroscope, and/or an actuator. Output component 550 enables device 500 to provide output, such as via a display, a speaker, and/or a light-emitting diode. Communication component 560 enables device 500 to communicate with other devices via a wired connection and/or a wireless connection. For example, communication component 560 may include a receiver, a transmitter, a transceiver, a modem, a network interface card, and/or an antenna.

Device 500 may perform one or more operations or processes described herein. For example, a non-transitory computer-readable medium (e.g., memory 530) may store a set of instructions (e.g., one or more instructions or code) for execution by processor 520. Processor 520 may execute the set of instructions to perform one or more operations or processes described herein. In some implementations, execution of the set of instructions, by one or more processors 520, causes the one or more processors 520 and/or the device 500 to perform one or more operations or processes described herein. In some implementations, hardwired circuitry may be used instead of or in combination with the instructions to perform one or more operations or processes described herein. Additionally, or alternatively, processor 520 may be configured to perform one or more operations or processes described herein. Thus, implementations described herein are not limited to any specific combination of hardware circuitry and software.

The number and arrangement of components shown in FIG. 5 are provided as an example. Device 500 may include additional components, fewer components, different components, or differently arranged components than those shown in FIG. 5. Additionally, or alternatively, a set of components (e.g., one or more components) of device 500 may perform one or more functions described as being performed by another set of components of device 500.

Figure 6:
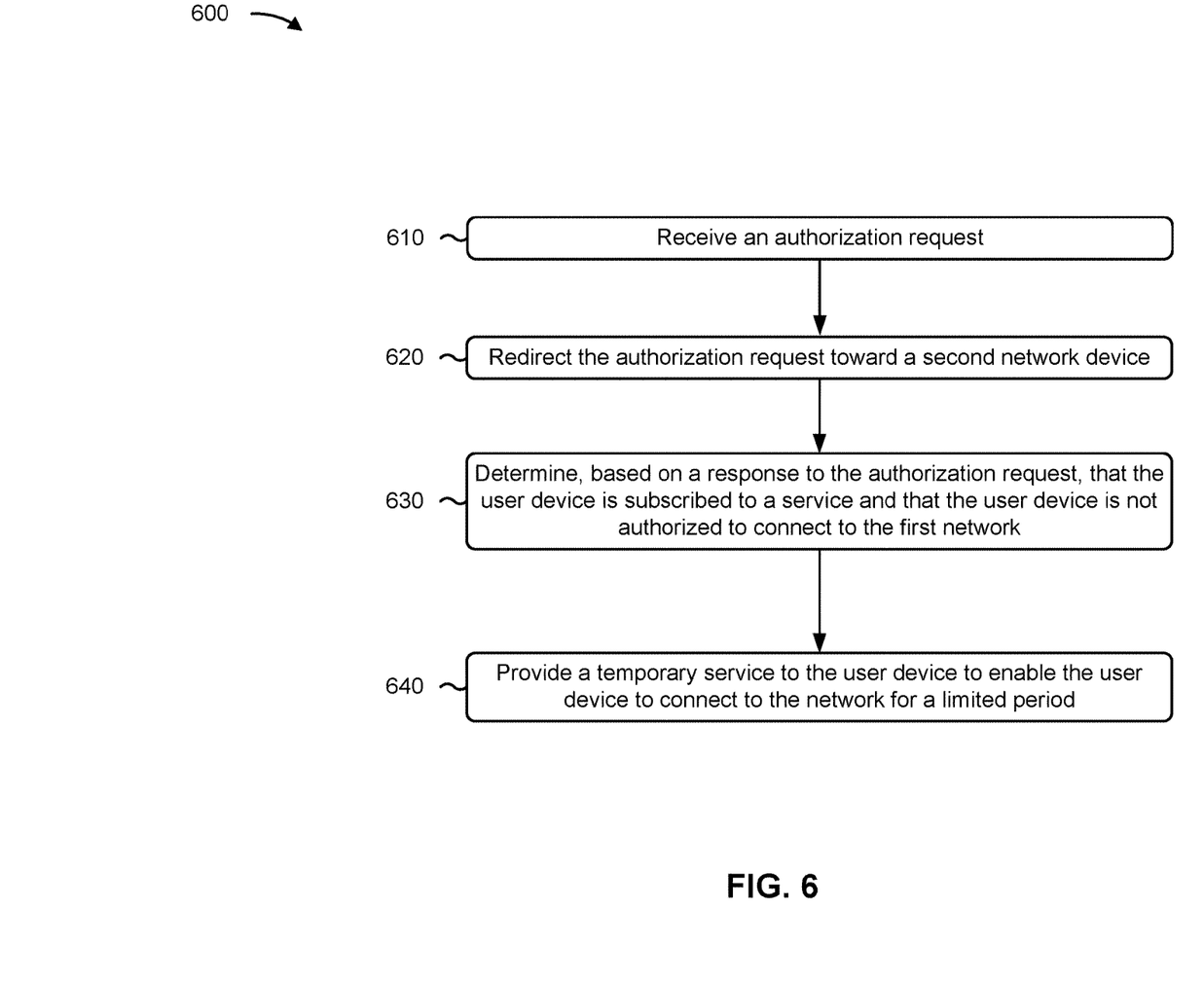
FIG. 6 is a flowchart of an example process relating to temporary service provisioning.

FIG. 6 is a flowchart of an example process 600 associated with temporary service provisioning. In some implementations, one or more process blocks of FIG. 6 may be performed by a first network device (e.g., first visitor network device 110). In some implementations, one or more process blocks of FIG. 6 may be performed by another device or a group of devices separate from or including the first network device, such as a user device (e.g., user device 105), a second network device (e.g., home network device 115), an HSS (e.g., SS device 205), EAS/SMSC (e.g., EAS/SMSC 210), an NSSF (e.g., NSSF 415), an NEF (e.g., NEF 420), an AUSF (e.g., AUSF 425), a UDM (e.g., UDM 430), a PCF (e.g., PCF 435), an AF (e.g., AF 440), an AMF (e.g., AMF 445), an SMF 108 (e.g., SMF 450), and/or a UPF (e.g., UPF 455). Additionally, or alternatively, one or more process blocks of FIG. 6 may be performed by one or more components of device 500, such as processor 520, memory 530, input component 540, output component 550, and/or communication component 560.

As shown in FIG. 6, process 600 may include receiving an authorization request (block 610). For example, the first network device may receive an authorization request associated with a user device connecting to a network associated with first network device, as described above.

As further shown in FIG. 6, process 600 may include redirecting the authorization request toward a second network device (block 620). For example, the user device may be associated with a second service provider and the first network device may redirect the authorization request toward a second network device associated with the second service provider, as described above.

As further shown in FIG. 6, process 600 may include determining, based on a response to the authorization request, that the user device is subscribed to a service and that the user device is not authorized to connect to the network (block 630). For example, the first network device may determine, based on a response to the authorization request, that the user device is subscribed to a service provided by the second service provider and that the user device is not authorized to connect to the network, as described above.

In some implementations, the response may include a cause code. The first network device may determine that the user device is subscribed to the service provided by the second service provider and that the user device is not authorized to connect to the network based on the cause code. For example, the first network device may determine that the user device is subscribed to the service provided by the second service provider and that the user device is not authorized to connect to the network based on the cause code comprising the fifth, sixth, and/or seventh cause code, as described above.

As further shown in FIG. 6, process 600 may include providing a temporary service to the user device to enable the user device to connect to the network for a limited time period and/or limited quantity of data (block 640). For example, the first network device may provide a temporary service to the user device to enable the user device to connect to the network for a limited period based on the user device being subscribed to the service provided by the second service provider and the user device not being authorized to connect to the network, as described above.

In some implementations, the first network device may transmit an authentication request to the user device. The first network device may receive an authentication credential from the user device based on transmitting the authentication request to the user device. The first network device may validate a format of the authentication credential and may provide the temporary service to the user device based on validating the format of the authentication credential.

In some implementations, the first network device creates a user account associated with the user device based on the user device being subscribed to the service of the second service provider and the user device not being authorized to connect to the network. The first network device may provide the temporary service to the user device based on creating the user account associated with the user device. In some implementations, the first network device provides information associated with a service provided by the first service provider based on providing the temporary service to the user device. The information associated with the service may include information that enables a user of the user device to subscribe to the service.

In some implementations, the first network device may determine an expiration of the time period. The first network device may disconnect the user device from the network based on the expiration of the limited period. In some implementations, the first network device determines that a quantity of data transmitted by the user device satisfies one or more criteria. The first network device may determine an expiration of the limited period based on the quantity of data satisfying the one or more criteria. The first network device may disconnect the user device from the network based on the expiration of the limited period.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:
receiving, by a first network device associated with a first service provider, an authorization request associated with a user device connecting to a network associated with the first network device;
redirecting, by the first network device, the authorization request toward a second network device associated with a second service provider;
determining, by the first network device and based on a response to the authorization request, that the user device is subscribed to a first service provided by the second service provider and that the user device is not authorized, by the second service provider, to connect to the network based on the user device not being subscribed to a second service provided by the second service provider;
providing, by the first network device, a temporary service to the user device to enable the user device to connect to the network for a limited period based on the user device being subscribed to the first service provided by the second service provider and the user device not being authorized, by the second service provider, to connect to the network,
wherein the limited period is defined by at least one of a quantity of time or a quantity of data; and
providing, by the first network device and to the user device, a message that includes information indicating a method for utilizing the temporary service to subscribe to a service provided by the first service provider.

2. The method of claim 1, wherein the response includes a cause code, and wherein the first network device determines that the user device is subscribed to the first service provided by the second service provider and that the user device is not authorized, by the second service provider, to connect to the network based on the cause code.

3. The method of claim 1, further comprising:
transmitting an authentication request to the user device;
receiving an authentication credential from the user device based on transmitting the authentication request to the user device; and
validating a format of the authentication credential,
wherein the temporary service is provided to the user device based on validating the format of the authentication credential.

4. The method of claim 1, wherein providing the message comprising:
providing the message to the user device via one or more of:
a short message service message,
an email,
a rich communication services message, or
a text message.

5. The method of claim 1, further comprising:
determining an expiration of the limited period; and disconnecting the user device from the network based on the expiration of the limited period.

6. The method of claim 1, further comprising:
determining that a quantity of transmitted data associated with the user device satisfies one or more criteria associated with the quantity of data;
determining an expiration of the limited period based on the quantity of transmitted data satisfying the one or more criteria; and
disconnecting the user device from the network based on the expiration of the limited period.

7. The method of claim 1, further comprising:
creating a user account with the first service provider that is associated with the user device based on the user device being subscribed to the first service provided by the second service provider and the user device not being authorized, by the second service provider, to connect to the network,
wherein the user device is provided the temporary service based on creating the user account associated with the user device.

8. A first network device, comprising:
one or more processors configured to:
receive an authorization request associated with a user device connecting to a network associated with a first network device,
wherein the first network device is associated with a first service provider and the user device is subscribed to a first service provided by a second service provider that is different from the first service provider;
forward the authorization request toward a second network device associated with the second service provider;
receive a response to the authorization request;
determine, based on the response, that the user device is subscribed to the first service provided by the second service provider and that the user device is not authorized, by the second service provider, to connect to the network based on the user device not being subscribed to a second service provided by the second service provider;
provide a temporary service to the user device to enable the user device to connect to the network for a period based on the user device being subscribed to the first service provided by the second service provider and the user device not being authorized, by the second service provider, to connect to the network; and
provide, to the user device, a message that includes information indicating a method for utilizing the temporary service to subscribe to a service provided by the first service provider.

9. The first network device of claim 8, wherein the period is defined by one or more of a quantity of minutes that the user device is connected to the network, a quantity of data transmitted to the user device, or a quantity of data transmitted by the user device.

10. The first network device of claim 8, wherein the second service corresponds to a roaming service provided by the second service provider, and wherein, to determine that the user device is subscribed to the first service provided by the second service provider and that the user device is not authorized, by the second service provider, to connect to the first network, the one or more processors are configured to:
determine, based on the response, that the user device is not subscribed to the roaming service provided by the second service provider; and determine, based on the user device not being subscribed to the roaming service, that the user device is subscribed to the first service provided by the second service provider and that the user device is not authorized, by the second service provider, to connect to the network.

11. The first network device of claim 8, wherein the one or more processors, when providing the message, are configured to:
provide the message to the user device via one or more of:
a short message service message,
an email,
a rich communication services message, or
a text message.

12. The first network device of claim 8, wherein the one or more processors are further configured to:
determine an expiration of the period; and
disconnect the user device from the network based on the expiration of the period.

13. The first network device of claim 8, wherein the one or more processors are further configured to:
create a user account with the first service provider that is associated with the user device based on the user device being subscribed to the first service provided by the second service provider and the user device not being authorized, by the second service provider, to connect to the network,
wherein the user device is provided the temporary service based on creating the user account associated with the user device.

14. The first network device of claim 13, wherein the one or more processors are further configured to:
determine an expiration of the period;
disconnect the user device from the network based on the expiration of the period; and
associate, based on disconnecting the user device from the network, the user account with information indicating that the user device was previously attached to the network.

15. A non-transitory computer-readable medium storing a set of instructions, the set of instructions comprising:
one or more instructions that, when executed by one or more processors of a first network device associated with a first service provider, cause the first network device to:
receive an authorization request associated with a user device connecting to a network associated with a first network device,
wherein the user device is subscribed to a first service provided by a second service provider that is different from the first service provider;
forward the authorization request toward a second network device associated with the second service provider;
determine, based on a response to the authorization request including information indicating that the user device is not authorized, by the second service provider, to connect to the network, that the user device is subscribed to the first service provided by the second service provider and that the user device is not authorized, by the second service provider, to connect to the network based on the user device not being subscribed to a second service provided by the second service provider;
provide a temporary service to the user device to enable the user device to connect to the network for a period based on the user device being subscribed to the first service provided by the second service provider and the user device not being authorized, by the second service provider, to connect to the network; and provide, to the user device, a message that includes information indicating a method for utilizing the temporary service to subscribe to a service provided by the first service provider.

16. The non-transitory computer-readable medium of claim 15, wherein the period is defined by one or more of a quantity of minutes that the user device is connected to the network, a quantity of data received by the user device, or a quantity of data transmitted by the user device.

17. The non-transitory computer-readable medium of claim 15, wherein the one or more instructions further cause the first network device to:

transmit an authentication request to the user device;

receive an authentication credential from the user device based on transmitting the authentication request to the user device; and validate a format of the authentication credential,
wherein the temporary service is provided to the user device based on validating the format of the authentication credential.

18. The non-transitory computer-readable medium of claim 15, wherein the message is provided via one or more of:

a short message service message,
an email,
a rich communication services message, or
a text message.

19. The non-transitory computer-readable medium of claim 15, wherein the one or more instructions further cause the first network device to:

determine an expiration of the period; and disconnect the user device from the network based on the expiration of the period.

20. The non-transitory computer-readable medium of claim 15, wherein the one or more instructions further cause the first network device to:

create a user account with the first service provider that is associated with the user device based on the user device being subscribed to the first service provided by the second service provider and the user device not being authorized, by the second service provider, to connect to the network,
wherein the user device is provided the temporary service based on creating the user account associated with the user device;

determine an expiration of the period;

disconnect the user device from the network based on the expiration of the period; and associate, based on disconnecting the user device from the network, the user account with information indicating that the user device was previously attached to the network.

* * * * *